US011283105B2

(12) United States Patent
Guo et al.

(10) Patent No.: US 11,283,105 B2
(45) Date of Patent: Mar. 22, 2022

(54) BATTERY HAVING HIGH BATTERY CAPACITY

(71) Applicant: BOE TECHNOLOGY GROUP CO., LTD., Beijing (CN)

(72) Inventors: Meng Guo, Beijing (CN); Yung-Chiang Lee, Beijing (CN); Quanguo Zhou, Beijing (CN); Ronghua Lan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 376 days.

(21) Appl. No.: 16/394,983

(22) Filed: Apr. 25, 2019

(65) Prior Publication Data

US 2020/0067132 A1 Feb. 27, 2020

(30) Foreign Application Priority Data

Aug. 27, 2018 (CN) .......................... 201810979151.4

(51) Int. Cl.
*H01M 10/0562* (2010.01)
*H01M 4/04* (2006.01)
(Continued)

(52) U.S. Cl.
CPC ......... *H01M 10/0562* (2013.01); *H01M 4/04* (2013.01); *H01M 4/64* (2013.01);
(Continued)

(58) Field of Classification Search
CPC .. H01M 10/0562; H01M 50/531; H01M 4/04; H01M 4/64; H01M 10/058;
(Continued)

(56) References Cited

U.S. PATENT DOCUMENTS

| 2011/0281160 A1 | 11/2011 | Doi |
| 2013/0114120 A1* | 5/2013 | Jung ...................... G02B 26/02 |
| | | 359/228 |
| 2016/0329604 A1 | 11/2016 | Izumi |

FOREIGN PATENT DOCUMENTS

| CN | 101569030 | 10/2009 |
| CN | 104904039 | 9/2015 |

(Continued)

OTHER PUBLICATIONS

Office Action dated Oct. 9, 2019 for Chinese Patent Application 201810979151.4.

*Primary Examiner* — Gary D Harris
(74) *Attorney, Agent, or Firm* — Thomas | Horstemeyer, LLP (57) ABSTRACT

The present disclosure relates to a battery, including a first electrode layer, a second electrode layer, and an electrolyte disposed between the first and second electrode layers. The first electrode layer at least comprises a first electrode and a second electrode, which are spaced apart from each other. An electrolyte is disposed between the first electrode and the second electrode. A polarity of the first electrode is opposite of a polarity of the second electrode. The second electrode layer includes a third electrode disposed on an end opposite to the first electrode and a fourth electrode disposed on an end opposite to the second electrode. An electrolyte is disposed between the third electrode and the fourth electrode. A polarity of the third electrode is the same as that of the second electrode, and a polarity of the fourth electrode is the same as that of the first electrode.

20 Claims, 4 Drawing Sheets

(51) Int. Cl.
  *H01M 4/64* (2006.01)
  *H01M 10/058* (2010.01)
  *H01M 50/531* (2021.01)

(52) U.S. Cl.
  CPC ....... *H01M 10/058* (2013.01); *H01M 50/531* (2021.01); *H01M 2300/0065* (2013.01)

(58) Field of Classification Search
  CPC ....... H01M 2300/0065; H01M 10/052; H01M 10/04; H01M 4/0404; H01M 10/0418; Y02P 70/50; Y02E 60/10
  USPC .......................................................... 429/304
  See application file for complete search history.

(56) References Cited

FOREIGN PATENT DOCUMENTS

| | | |
|---|---|---|
| CN | 105244527 | 1/2016 |
| CN | 106099169 | 11/2016 |
| CN | 106463677 | 2/2017 |
| WO | 9701194 | 1/1997 |

* cited by examiner

BATTERY HAVING HIGH BATTERY CAPACITY

CROSS-REFERENCE TO RELATED APPLICATIONS

This application is based upon, claims the benefit of and claims priority to Chinese Patent Application No. 201810979151.4, filed on Aug. 27, 2018, the entire contents thereof being incorporated herein by reference.

TECHNICAL FIELD

The present disclosure relates to the technical field of batteries, and particularly to a battery.

BACKGROUND

At present, a solid-state battery often adopts a stacked structure. The structure is mainly formed by stacking several structures, such as a single cell, an electrolyte, a positive electrode tab, and a negative electrode tab, which are the same in structure and size. A battery with such structure has a lower ionic conductivity, so that battery capacity can be affected.

SUMMARY

As the first aspect according to an implementation of the present disclosure, it is provided with a battery. The battery includes a first electrode layer, a second electrode layer, and an electrolyte disposed between the first electrode layer and the second electrode layer.

The first electrode layer at least comprises a first electrode and a second electrode. The first electrode and the second electrode are spaced apart from each other. An electrolyte is also disposed between the first electrode and the second electrode. A polarity of the first electrode is opposite that of a polarity of the second electrode. The second electrode layer at least comprises a third electrode disposed on an end opposite to the first electrode and a fourth electrode disposed on an end opposite to the second electrode. An electrolyte is also disposed between the third electrode and the fourth electrode. A polarity of the third electrode is the same as a polarity of the second electrode, and a polarity of the fourth electrode is the same as the polarity of the first electrode.

In one implementation, a distance between the first electrode and the third electrode is equal to a distance between the first electrode and the second electrode.

In some implementations, the first electrode layer includes a plurality of first electrodes and a plurality of second electrodes, wherein the plurality of first electrodes and the plurality of second electrodes are spaced apart from each other. The third electrode is disposed on the end opposite to each of the first electrodes, and the fourth electrode is disposed on the end opposite to each of the second electrodes.

In some implementations, a first electrode current collector is disposed outside the first electrode, a second electrode current collector is disposed outside the second electrode, a third electrode current collector is disposed outside the third electrode, and a fourth electrode current collector is disposed outside the fourth electrode.

In some implementations, an area of a lower surface of the first electrode current collector is greater than or equal to an area of an upper surface of the first electrode;

an area of a lower surface of the second electrode current collector is greater than or equal to an area of an upper surface of the second electrode;

an area of an upper surface of the third electrode current collector is greater than or equal to an area of a lower surface of the third electrode;

an area of an upper surface of the fourth electrode current collector is greater than or equal to an area of a lower surface of the fourth electrode.

In some implementations, the electrolyte is an all-solid-state electrolyte.

In some implementations, the battery includes a first electrode line connected to the first electrode current collector, a second electrode line connected to the second electrode current collector, a third electrode line connected to the third electrode current collector, and a fourth electrode line connected to the fourth electrode current collector.

In some implementations, a sum of the first electrodes and the second electrodes is greater than 3, and a sum of the third electrodes and the fourth electrodes is greater than 3.

In some implementations, both the first electrode and the fourth electrode are anodes, and both the second electrode and the third electrode are both cathodes; or both the first electrode and the fourth electrode are cathodes, and both the second electrode and the third electrode are both anodes.

As the second aspect according to the implementation of the present disclosure, it is provided with a manufacturing method of a battery, comprising:

providing a first substrate;

coating a first electrode material on the first substrate to form a first electrode material layer, and etching the first electrode material layer to form a first electrode;

coating a second electrode material on the first substrate to form a second electrode material layer, and etching the second electrode material layer to form a second electrode spaced apart from the first electrode, to form a first electrode layer; wherein the first electrode has a polarity opposite to that of the second electrode;

coating an electrolyte material between the first electrode and the second electrode, on the first electrode, and on the second electrode to form an electrolyte;

arranging a third electrode on the end opposite to the first electrode and arranging a fourth electrode on the end opposite to the second electrode to form a second electrode layer; wherein the polarity of the third electrode is the same as the polarity of the second electrode, and the polarity of the fourth electrode is the same as the polarity of the first electrode.

It is understood that both the foregoing general description and the following detailed description of the present disclosure are exemplary and explanatory, rather than limit the present disclosure.

BRIEF DESCRIPTION OF THE DRAWINGS

The accompanying drawings herein are incorporated in and constitute a part of the present disclosure, illustrate implementations in accordance to the present disclosure, and serve to explain the principle of the disclosure together with the specification.

DETAILED DESCRIPTION

The exemplary implementations will be described in detail, and are illustrated in the accompanying drawings. When the description hereinafter refers to the drawings, the same number in the different drawings indicates to the same or similar elements, unless having another indication. The example implementations as described below do not represent all implementations in consistence with the present disclosure. Instead, these implementations are merely examples of devices and methods corresponding to the some aspects of the present disclosure, as claimed in the claims.

Figure 1:
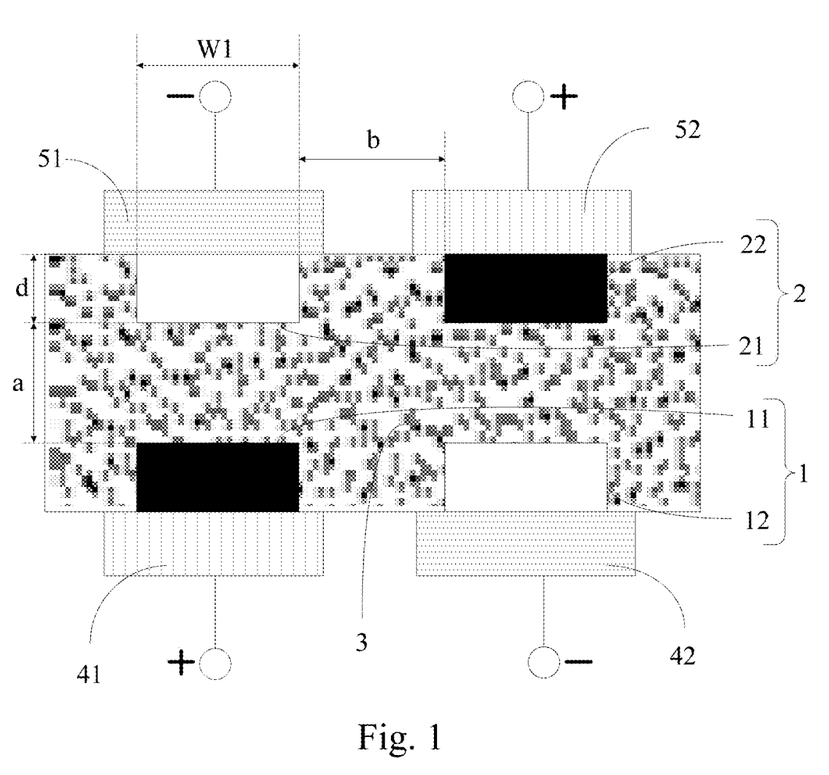
FIG. 1 is a schematic structural view of a partial structure of a battery according to an implementation of the present disclosure.

FIG. 1 is a schematic structural view of a partial structure of a battery according to an embodiment of the present disclosure.

Figure 2:
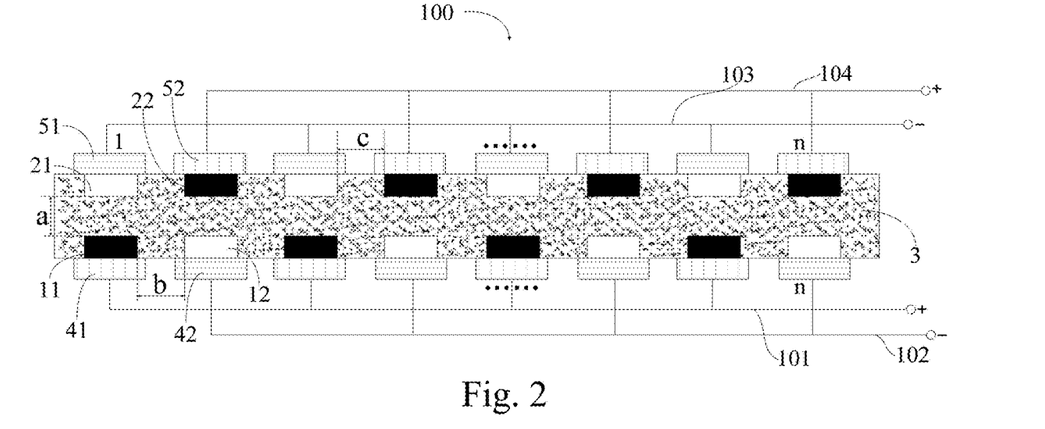
FIG. 2 is a schematic structural view of the battery according to the implementation of the present disclosure.
Figure 3:
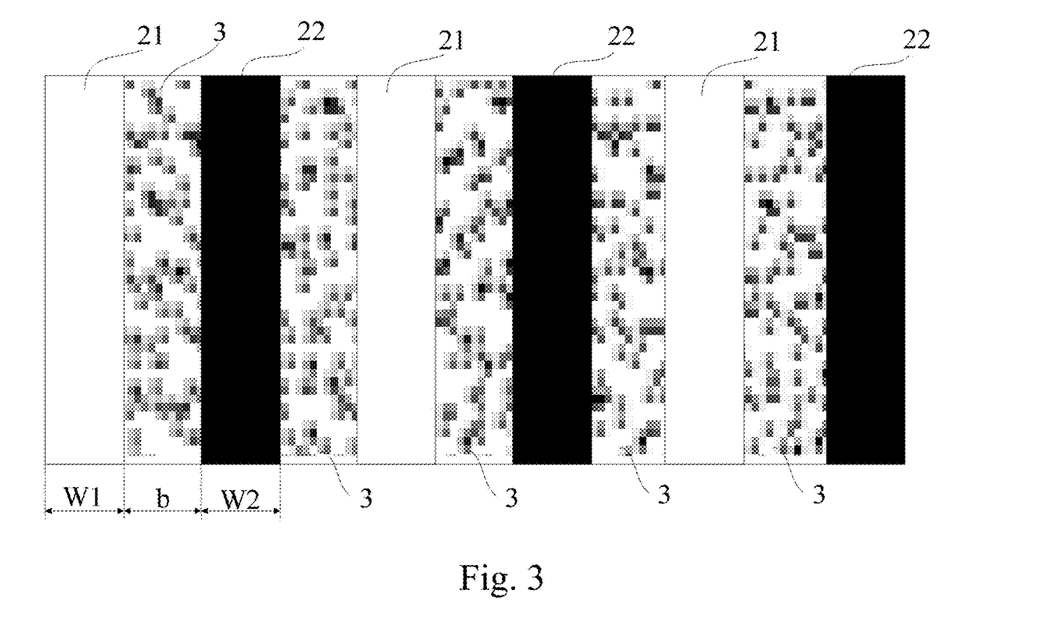
FIG. 3 is a top view of a battery removing electrode current collector according to the implementation of the present disclosure.

Referring to FIG. 1, and in combination with FIG. 2 and FIG. 3 if necessary, the battery includes a first electrode layer 1, a second electrode layer 2, and an electrolyte 3 disposed between the first electrode layer 1 and the second electrode layer 2.

The first electrode layer 1 at least includes a first electrode 11 and a second electrode 12, which are spaced apart from one another. An electrolyte 3 is also disposed between the first electrode 11 and the second electrode 12. The first electrode 11 has a polarity opposite to that of the second electrode 12. The second electrode layer 2 at least includes a third electrode 21 disposed on an end opposite to the first electrode 11 and a fourth electrode 22 disposed on an end opposite to the second electrode 12. An electrolyte 3 is also disposed between the third electrode 21 and the fourth electrode 22. Also, the third electrode 21 has a polarity as same as that of the second electrode 12, and the fourth electrode 22 has a polarity as same as that of the first electrode 11. The battery 100 formed in this way has an ion transmission channel formed between the first electrode 11 and the second electrode 12 of the first electrode layer 1, and also formed between the third electrode 21 and the fourth electrode 22 of the second electrode layer 2, while the ion transmission channel is formed on the first electrode layer 1 and the second electrode layer 2. The ion transmission channels are increased, that is, ion exchange surface is increased which is beneficial to improve the ionic conductivity of the battery so as to improve the battery capacity.

In some implementations, both the first electrode 11 and the fourth electrode 22 are anodes, and both the second electrode 12 and the third electrode 21 are cathodes. Of course, in some other implementations, both the first electrode 11 and the fourth electrode 22 are cathodes, and both the second electrode 12 and the third electrode 21 are anodes. The present disclosure is not limited thereto, and an arrangement may be made according to the specific application environment.

Further, a distance a between the first electrode 11 and the third electrode 21 is equal to a distance b between the first electrode 11 and the second electrode 12. Correspondingly, a distance c between the third electrode 21 and the fourth electrode 22 is also equal to the distance a as well as the distance b, which ensures the same potential difference between the different electrodes to avoid ion transmission imbalance. Of course, the distance a, the distance b, and the distance c may not be completely identical to one another. The present disclosure is not limited thereto, and an arrangement may be made according to the specific application environment.

Further, the first electrode(s) 11 included in the first electrode layer 1 may be one or in plural. The second electrode(s) 12 included in the first electrode layer 1 may be one or in plural. As such, a sum of the first electrode(s) 11 and the second electrode(s) 12 included in the first electrode layer 1 may be 2 or any positive number more than 2, such as 3 or 4 or 5 or the like.

In some implementations, the first electrode layer 1 includes a plurality of first electrodes 11 and a plurality of second electrodes 12. The plurality of first electrodes 11 and the plurality of second electrodes 12 are spaced apart from one another, that is, one second electrode 12 is disposed between every two first electrodes 11, and one first electrode 11 is disposed between every two second electrodes 12. Also, the third electrode 21 is disposed on an end opposite to each of the first electrodes 11, and the fourth electrode 22 is disposed on the end opposite to each of the second electrodes 12. Of course, in other implementations, the plurality of first electrodes 11 and the plurality of second electrodes 12 may be spaced apart one another non-strictly. For example, two second electrodes are disposed between the two first electrodes, which can increase the ion exchange area. The present disclosure is not limited thereto, and an arrangement may be made according to the specific application environment.

Optionally, in some embodiments, a width W1 of the third electrode 21 and a width W2 of the fourth electrode 22 are the same, and both may be equal to the distance b. As an example of the single battery having a X battery capacity, the battery 100 of the present disclosure is used, in which the first electrode layer 1 includes n electrodes, and the second electrode layer 2 also includes n electrodes opposite to the respective electrodes in the first electrode layer 1, as shown in FIG. 2. In the battery 100 of the present disclosure, the battery capacities of the first electrode layer and the second electrode layer are respectively (n−1)X, and the battery capacity between the first electrode layer 1 and the second electrode layer 2 is nX, so that the total capacity of the battery 100 is (3n−2)X. In the conventional battery structure, even if each of the electrode layers is entirely provided with the electrodes with the same polarity, the battery capacity is also (2n−1)X. That is, in the case of the same size, the battery capacity is at least (2n−1)X in the conventional battery structure. When n is greater than 2, the battery 100 of the present disclosure has a battery capacity larger than that of the conventional battery. And, with increasing of n, an increased amplitude of the battery capacity of the battery 100 is greater than the increased amplitude of the battery capacity of the conventional battery. It is advantageous to increase the battery capacities by appropriately increasing the number n of electrodes in each electrode layer.

In some embodiments, a certain relationship should be satisfied between a thickness d of the third electrode 21 and a width W1 of the third electrode 21 to ensure the ion exchange area increases in each of the electrode layers, which can improve the battery capacity greatly. For example, the width W1 of the third electrode 21 and the width W2 of the fourth electrode 22 are both equal to the distance b. The relationship between the thickness d of the third electrode 21 and the width W1 of the third electrode 21 should satisfy the following formula: W1<2d, to ensure the ion exchange area increased in the first electrode layer 1 and the second electrode layer 2 can improve the capacity of the battery 100 greatly.

Further, in some embodiments, the electrolyte 3 may be an all-solid-state electrolyte. Correspondingly, the battery 100 is an all-solid-state battery, such as an all-solid-state lithium battery.

Further, in some embodiments, a first electrode current collector 41 is disposed outside the first electrode 11, a second electrode current collector 42 is disposed outside the second electrode 12, a third electrode current collector 51 is disposed outside the third electrode 21, and a fourth electrode current collector 52 is disposed outside the fourth electrode 22. The arrangement of these electrode current collectors facilitates for collection of currents in the electrodes.

In some embodiments, an area of the lower surface of the first electrode current collector 41 is larger than an area of the upper surface of the first electrode 11, an area of the lower surface of the second electrode current collector 41 is larger than an area of the upper surface of the second electrode 12, an area of the upper surface of the third electrode current collector 51 is larger than an area of the lower surface of the third electrode 21, and an area of the upper surface of the fourth electrode current collector 52 is larger than an area of the lower surface of the fourth electrode 22, which facilitates collecting the currents in respective electrodes more sufficiently. Of course, the area of the lower surface of the first electrode current collector 41 may also be equal to the area of the upper surface of the first electrode 11, the area of the lower surface of the second electrode current collector 41 may also be equal to the area of the upper surface of the second electrode 12, the area of the upper surface of the third electrode current collector 51 may also be equal to the area of the lower surface of the third electrode 21, and the area of the upper surface of the fourth electrode current collector 52 may also be equal to the area of the lower surface of the fourth electrode 22. The present disclosure is not limited thereto and the arrangement may be made according to the specific application environment.

In some implementations, if the first electrode 11 and the fourth electrode 22 are anodes, and the second electrode 12 and the third electrode 21 are cathodes, the first electrode current collector 41 and the fourth electrode current collector 52 are made of aluminum, and the second electrode current collector 42 and the third electrode current collector 51 are made of copper. If the first electrode 11 and the fourth electrode 22 are cathodes, and the second electrode 12 and the third electrode 21 are anodes, the first electrode current collector 41 and the fourth electrode current collector 52 are made of copper, and the second electrode current collector 42 and the third electrode current collector 51 are made of aluminum.

Further, the battery 100 includes a first electrode line 101 connected to the first electrode current collector 41, a second electrode line 102 connected to the second electrode current collector 42, a third electrode line 103 connected to the third electrode current collector 51, and a fourth electrode line 104 connected to the four electrode current collector 52, which leads the current out of the battery.

Additionally, the battery 100 may further include a first substrate (not shown) disposed outside the first electrode layer 1 (i.e., disposed under the first electrode layer 1) and a second substrate 2 (not shown) disposed outside the second electrode layer 2 (i.e., disposed above the second electrode layer 2) to support and fix the respective electrodes and electrolytes.

This implementation has an advantage: the ion transmission channel is further formed between the electrodes with different polarities as included in the same electrode layer while the ion transmission channel is formed between the different electrode layers, by arranging electrodes with different polarities at intervals on the same electrode layer, to increase the ion transmission channels, that is, to increase the ion exchange surface, which is beneficial to increase the ionic conductivity of the battery, and thereby increasing the battery capacity.

Figure 4:
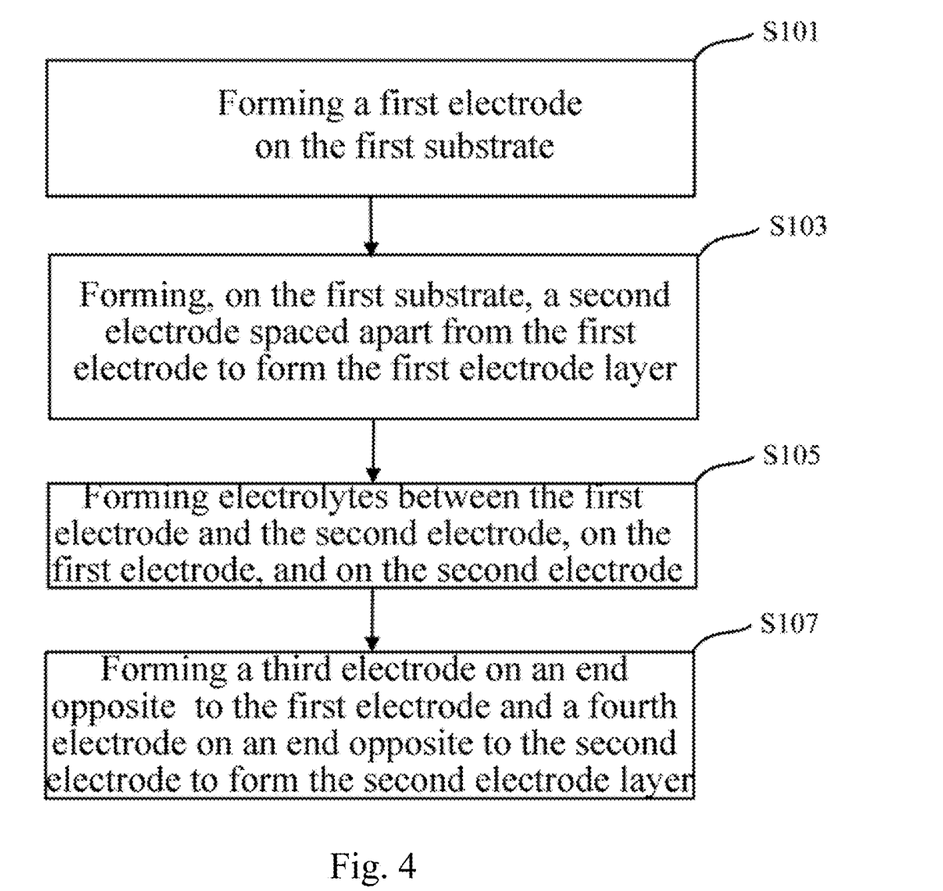
FIG. 4 is a flow chart showing a manufacturing method of a battery according to the implementation of the present disclosure.

In addition, the present disclosure also provides a manufacturing method of a battery, which may be used in production and manufacture of the battery 100. As shown in FIG. 4, the manufacturing method of the battery includes the following steps S101, S103, S105, and S107.

In step S101, the first electrode 11 is formed on the first substrate.

Specifically, forming the first electrode 11 on the first substrate may include coating a first electrode material on the first substrate to form a first electrode material layer, and etching the first electrode material layer to form the first electrode 11.

In step S103, the second electrode 12 spaced apart from the first electrode 11 is formed on the first substrate to form the first electrode layer 1, wherein the first electrode 11 and the second electrode 12 have polarities opposite of one another.

Specifically, the second electrode material may be coated on the first substrate to form a second electrode material layer, and the second electrode material layer may be etched to form the second electrode 12 so that the first electrode layer 1 including the first electrode 11 and the second electrode 12 is formed.

In step S105, electrolytes 3 are formed between the first electrode 11 and the second electrode 12, on the first electrode 11, and on the second electrode 12.

In step S105, the electrolyte 3 may also be formed by the way of coating an electrolyte material. The electrolyte may be a solid-state electrolyte, such as an all-solid-state electrolyte.

In step S107, a third electrode 21 is arranged on an end opposite to the first electrode 11, and a fourth electrode 22 is arranged on an end opposite to the second electrode 12 to form the second electrode layer 2. The polarity of the third electrode 21 is the same as the polarity of the second electrode 12, and the polarity of the fourth electrode 22 is the same as the polarity of the first electrode 11.

Specifically, in some implementations, the step of arranging the third electrode 21 on the end opposite to the first electrode 11, and arranging the fourth electrode 22 on the end opposite to the second electrode 12 may include the step of coating the third electrode material on the second substrate to form the third electrode, and etching the third electrode material layer to form the third electrode 21, and coating the fourth electrode material on the second substrate to form the fourth electrode material layer, and etching the fourth electrode material layer to form the fourth electrode 22 spaced apart from the third electrode 2, so as to form the second electrode layer 2. The second electrode layer is covered on the electrolyte 3 together with the second substrate, the third electrode 21 is disposed on the end opposite to the first electrode 11, and the fourth electrode 22 is disposed on the end opposite to the second electrode 12, so that the third electrode 21 and the electrodes 22 are embedded in the electrolyte 3 such that there is an electrolyte between the third electrode 21 and the fourth electrode 22, so as to form the battery 100.

In some other implementations, after forming the electrolyte in step S105, the third electrode 21 positioned on the end opposite to the first electrode 11 and the fourth electrode 22 positioned on the end opposite to the second electrode 12 are directly formed on the electrolyte such that an electrode layer is formed. The third electrode material layer may be formed by coating the third electrode material over the electrolyte 3, and the third electrode 21 may be formed by the way of etching. Furthermore, a fourth electrode material layer may be formed by coating the fourth electrode material on the electrolyte 3, and the fourth electrode 22 spaced apart from the third electrode 21 may also be formed by the way of etching, such that a second electrode layer 2 is formed. In addition, it is also required to provide an electrolyte between the third electrode 21 and the fourth electrode 22. Of course, the electrolyte may also be processed in advance. A receiving space for arranging the third electrode and the fourth electrode is formed in the electrolyte. The present disclosure is not limited thereto, and the arrangement may be made according to the specific application environment.

It should be noted that formation of the second electrode layer is not limited in the present disclosure, and may be arranged according to the specific application environment.

Figure 5:
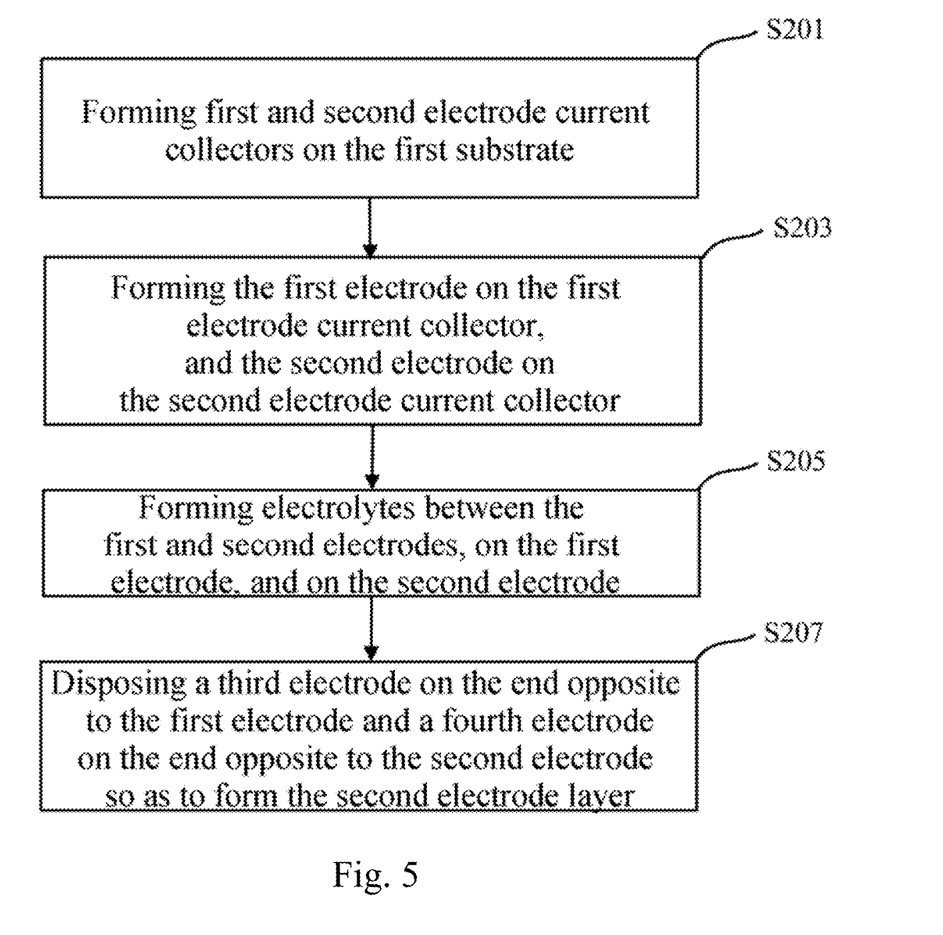
FIG. 5 is a flow chart showing another manufacturing method of a battery according to the implementation of the present disclosure.

In addition, the present disclosure also provides another manufacturing method of a battery. As shown in FIG. 5, the manufacturing method includes the following steps S201, S203, S205, and S207.

In step S201, first and second electrode current collectors 41, 42 are formed on the first substrate.

Specifically, a first electrode current collector material may be coated on the first substrate to form a first electrode current collector material layer, and the first electrode current collector material layer is etched to form the first electrode current collector 41. Similarly, a second electrode current collector material may be coated on the first substrate to form a second electrode current collector material layer, and the second electrode current collector material layer may be etched to form a second electrode current collector 42.

In step S203, the first electrode 11 is formed on the first electrode current collector 41, and the second electrode 12 is formed on the second electrode current collector 42. In step S203, coating way may also be used. Specifically, the first electrode material may be directly coated on the first electrode current collector 41 to form the first electrode 11. Of course, it may also be implemented by other means, which is not limited in the present disclosure and may be arranged according to the specific application environment. The formation of the second electrode 12 may refer to the formation of the first electrode 11.

In step S205, an electrolyte is formed between the first electrode 11 and the second electrode 12, on the first electrode 11, and on the second electrode 12.

In step S205, the electrolyte 3 may also be formed by coating an electrolyte material.

In step S207, the third electrode 21 is disposed on the end opposite to the first electrode 11, and the fourth electrode 22 is disposed on the end opposite to the second electrode 12, such that the second electrode layer 2 is formed. The polarity of the third electrode 21 is the same as the polarity of the second electrode 12, and the polarity of the fourth electrode 22 is the same as the polarity of the first electrode 11.

For the specific implementation of step S207, please refer to the relevant description in step S107 as set forth in the previous implementations, which will be omitted herein.

In the present disclosure, the terms "first" and "second" are used only for the purpose of illustration, but not to be construed as indicating or implying relative importance. The term "a plurality of" refers to two or more, unless specifically defined otherwise. The terms "front", "back", "left", "right", "lower" and/or "upper" and the like are used for convenience of description, rather than being limited to one position or one spatial orientation.

The person skilled in the art, upon consideration of the specification and after practice of this disclosure, would easily conceive of the other embodiments of the present disclosure. The present disclosure is directed to encompass any variation, use or adaptive change, which accord to the general principles of the present disclosure and include common knowledge or the customary means in the art but not disclosed in the present disclosure. The specification and the embodiments are regarded to be illustrative only, and the scope and the spirit of the present disclosure are defined within the claims.

It should be understood that the present disclosure is not limited to the precise structure that has been described above and is shown in the drawings, and can make various modifications and changes without departing from the scope thereof. The scope of the present disclosure is limited only by the appended claims

What is claimed is:

1. A battery having high battery capacity, comprising:
    a first electrode layer, a second electrode layer, and an electrolyte disposed between the first electrode layer and the second electrode layer, wherein:
        the first electrode layer at least comprises a first electrode and a second electrode, the first electrode and the second electrode being spaced apart from each other, an electrolyte being disposed between the first electrode and the second electrode, and a polarity of the first electrode being opposite to a polarity of the second electrode;
        the second electrode layer comprises a third electrode disposed on an end opposite to the first electrode and a fourth electrode disposed on an end opposite to the second electrode, an electrolyte being disposed between the third electrode and the fourth electrode, a polarity of the third electrode being the same as the polarity of the second electrode, and a polarity of the fourth electrode being the same as the polarity of the first electrode; and
        a first electrode current collector is disposed outside the first electrode, a second electrode current collector is disposed outside the second electrode, a third electrode current collector is disposed outside the third electrode, and a fourth electrode current collector is disposed outside the fourth electrode.

2. The battery having high battery capacity of claim 1, wherein a distance between the first electrode and the third electrode is equal to a distance between the first electrode and the second electrode.

3. The battery having high battery capacity of claim 1, wherein the first electrode layer comprises a plurality of first electrodes and a plurality of second electrodes, the plurality of first electrodes and the plurality of second electrodes being spaced apart from each other, the third electrode being disposed on the end opposite to each of the first electrodes, and the fourth electrode being disposed on the end opposite to each of the second electrodes.

4. The battery having high battery capacity of claim 1, wherein,
an area of a lower surface of the first electrode current collector is greater than or equal to an area of an upper surface of the first electrode;
an area of a lower surface of the second electrode current collector is greater than or equal to an area of an upper surface of the second electrode;
an area of an upper surface of the third electrode current collector is greater than or equal to an area of a lower surface of the third electrode; and
an area of an upper surface of the fourth electrode current collector is greater than or equal to an area of a lower surface of the fourth electrode.

5. The battery having high battery capacity of claim 1, wherein the electrolyte is an all-solid-state electrolyte.

6. The battery having high battery capacity of claim 1, wherein the battery having high battery capacity comprises a first electrode line connected to the first electrode current collector, a second electrode line connected to the second electrode current collector, a third electrode line connected to the third electrode current collector, and a fourth electrode line connected to the fourth electrode current collector.

7. The battery having high battery capacity of claim 3, wherein:
the second electrode layer comprises a plurality of third electrodes and a plurality of fourth electrodes; and
a sum of the first electrodes and the second electrodes is greater than 3, and a sum of the third electrodes and the fourth electrodes is greater than 3.

8. The battery having high battery capacity of claim 1, wherein both the first electrode and the fourth electrode are anodes, and both the second electrode and the third electrode are both cathodes; or
both the first electrode and the fourth electrode are cathodes, and both the second electrode and the third electrode are both anodes.

9. A manufacturing method of a battery having high battery capacity, comprising:
providing a first substrate;
coating a first electrode material on the first substrate to form a first electrode material layer and etching the first electrode material layer to form a first electrode;
coating a second electrode material on the first substrate to form a second electrode material layer and etching the second electrode material layer to form a second electrode spaced apart from the first electrode to form a first electrode layer, wherein the first electrode has a polarity opposite that of the second electrode;
coating an electrolyte material between the first electrode and the second electrode, on the first electrode, and on the second electrode to form an electrolyte;
arranging a third electrode on the end opposite to the first electrode and arranging a fourth electrode on the end opposite to the second electrode to form a second electrode layer, wherein the polarity of the third electrode is the same as the polarity of the second electrode, and the polarity of the fourth electrode is the same as the polarity of the first electrode; and
disposing a first electrode current collector outside the first electrode, disposing a second electrode current collector outside the second electrode, disposing a third electrode current collector outside the third electrode, and disposing a fourth electrode current collector outside the fourth electrode.

10. The method of claim 9, wherein a distance between the first electrode and the third electrode is equal to a distance between the first electrode and the second electrode.

11. The method of claim 9, wherein the first electrode layer comprises a plurality of first electrodes and a plurality of second electrodes, the plurality of first electrodes and the plurality of second electrodes being spaced apart from each other, the third electrode being disposed on the end opposite to each of the first electrodes, and the fourth electrode being disposed on the end opposite to each of the second electrodes.

12. The method according to claim 9, wherein:
an area of a lower surface of the first electrode current collector is greater than or equal to an area of an upper surface of the first electrode;
an area of a lower surface of the second electrode current collector is greater than or equal to an area of an upper surface of the second electrode;
an area of an upper surface of the third electrode current collector is greater than or equal to an area of a lower surface of the third electrode; and
an area of an upper surface of the fourth electrode current collector is greater than or equal to an area of a lower surface of the fourth electrode.

13. The method of claim 9, wherein the electrolyte is an all-solid-state electrolyte.

14. The method of claim 9, further comprising:
forming a first electrode line connected to the first electrode current collector, a second electrode line connected to the second electrode current collector, a third electrode line connected to the third electrode current collector, and a fourth electrode connected to the fourth electrode current collector.

15. The method of claim 11, wherein:
the second electrode layer comprises a plurality of third electrodes and a plurality of fourth electrodes; and
a sum of the first electrodes and the second electrodes is greater than 3, and a sum of the third electrodes and the fourth electrodes is greater than 3.

16. The method of claim 9, wherein both the first electrode and the fourth electrode are anodes, and both the second electrode and the third electrode are both cathodes; or
both the first electrode and the fourth electrode are cathodes, and both the second electrode and the third electrode are both anodes.

17. A method, comprising:
providing a battery having high battery capacity, the battery comprising a first electrode layer, a second electrode layer, and an electrolyte disposed between the first electrode layer and the second electrode layer, wherein:
the first electrode layer at least comprises a first electrode and a second electrode, the first electrode and the second electrode being spaced apart from each other, an electrolyte being disposed between the first electrode and the second electrode, and a polarity of the first electrode being opposite to a polarity of the second electrode;
the second electrode layer comprises a third electrode disposed on an end opposite to the first electrode and a fourth electrode disposed on an end opposite to the second electrode, an electrolyte being disposed between the third electrode and the fourth electrode, a polarity of the third electrode being the same as the polarity of the second electrode, and a polarity of the fourth electrode being the same as the polarity of the first electrode; and a first electrode current collector is disposed outside the first electrode, a second electrode current collector is disposed outside the second electrode, a third electrode current collector is disposed outside the third electrode, and a fourth electrode current collector is disposed outside the fourth electrode.

18. The method of claim 17, wherein a distance between the first electrode and the third electrode is equal to a distance between the first electrode and the second electrode.

19. The method of claim 17, wherein the first electrode layer comprises a plurality of first electrodes and a plurality of second electrodes, the plurality of first electrodes and the plurality of second electrodes being spaced apart from each other, the third electrode being disposed on the end opposite to each of the first electrodes, and the fourth electrode being disposed on the end opposite to each of the second electrodes.

20. The method of claim 17, wherein:

an area of a lower surface of the first electrode current collector is greater than or equal to an area of an upper surface of the first electrode;

an area of a lower surface of the second electrode current collector is greater than or equal to an area of an upper surface of the second electrode;

an area of an upper surface of the third electrode current collector is greater than or equal to an area of a lower surface of the third electrode; and an area of an upper surface of the fourth electrode current collector is greater than or equal to an area of a lower surface of the fourth electrode.

* * * * *